US008238231B2

(12) United States Patent
Klein

(10) Patent No.: US 8,238,231 B2
(45) Date of Patent: Aug. 7, 2012

(54) QUALITY-DRIVEN OPTIMIZATION OF SENSOR STREAM PROCESSING

(75) Inventor: Anja Klein, Dresden (DE)

(73) Assignee: SAP AG, Walldorf (DE)

( * ) Notice: Subject to any disclaimer, the term of this patent is extended or adjusted under 35 U.S.C. 154(b) by 475 days.

(21) Appl. No.: 12/473,288

(22) Filed: May 28, 2009

(65) Prior Publication Data

US 2010/0302975 A1 Dec. 2, 2010

(51) Int. Cl.
*H04L 12/26* (2006.01)
(52) U.S. Cl. ......................................................... 370/225
(58) Field of Classification Search .................. 370/225, 370/252, 255, 331, 332, 338, 352
See application file for complete search history.

(56) References Cited

U.S. PATENT DOCUMENTS

| | | | | |
|---|---|---|---|---|
| 5,375,212 | A * | 12/1994 | Saini | 712/244 |
| 6,862,414 | B2 * | 3/2005 | Sampath et al. | 399/15 |
| 7,020,201 | B2 * | 3/2006 | Luo et al. | 375/240.16 |
| 7,970,786 | B2 * | 6/2011 | Bahrami et al. | 707/779 |
| 2007/0094162 | A1 * | 4/2007 | Aragones et al. | 706/13 |
| 2008/0263062 | A1 | 10/2008 | Klein et al. | |
| 2008/0263096 | A1 | 10/2008 | Klein et al. | |

OTHER PUBLICATIONS

D. Abadi, D. Carney, U. çetintemel, M. Cherniack, C. Convey, S. Lee, M. Stonebraker, N. Tatbul, and S. Zdonik;.Aurora: A new model and architecture for data stream management; VLDB Journal Special Issue on Best Papers of VLDB 2002, 12(2), 2003 (http://www.cs.brown.edu/research/aurora/vldb03_journal.pdf).

S. Chandrasekaran and O. Cooper; Telegraph cq: Continuous dataflow processing for an uncertain world; Proceedings of the 1st Biennial Conference on Innovative Data Systems Research, 2003 (http://db.cs.berkeley.edu/papers/cidr03-tcq.pdf).
Chuck Cranor, Theodore Johnson, Oliver Spataschek and Vladislav Shkapenyuk; Gigascope: A stream database for network applications; SIGMOD '03: Proceedings of the 2003 ACM SIGMOD International Conference on Management of Data, pp. 647-651, ACM New York, NY, USA, 2003 (http://citeseerx.ist.psu.edu/viewdoc/summary?doi=10.1.1.68.4467).
T. E. Daniel, R. M. Newman, E. I. Gaura and S. N. Mount; Complex query processing in wireless sensor networks; PM2HW2N '07: Proceedings of the 2nd ACM workshop on Performance Monitoring and Measurement of Heterogeneous Wireless and Wired Networks, pp. 53-60, ACM New York, NY, USA, 2007 (http://portal.acm.org/citation.cfm?id=1298287).
Samuel R. Madden, Michael J. Franklin, Joseph M. Hellerstein and Wei Hong; Tinydb: An Acquisitional Query Processing System for Sensor Networks; ACM Trans. Database Syst., 30(1):122-173, 2005 (http://www.cs.berkeley.edu/~franklin/Papers/TinyDBTods.pdf).
Felix Naumann, Ulf Leser and Johann Christoph Freytag; Quality-Driven Integration of Heterogenous Information Systems; VLDB '99: Proceedings of the 25th International Conference on Very Large Data Bases, pp. 447-458, Morgan Kaufmann Publishers Inc., San Francisco, CA, USA, 1999 (http://www.hiqiq.de/publications/VLDB99.pdf).

(Continued)

*Primary Examiner* — Dang Ton
*Assistant Examiner* — Nourali Mansoury

(57) ABSTRACT

A system and method to perform data quality driven optimization of data are described. In one embodiment, a method is presented to iteratively test configurations of a data processing path until a configuration that processes data to predefined quality requirements is identified. In one embodiment, a system is presented. The system includes a data quality initialization module, a primary data stream processing module and an optimization module that is incorporated in a memory chip on a computer processor.

16 Claims, 5 Drawing Sheets

OTHER PUBLICATIONS

Uwe Roehm, Mohamed Medhat Gaber and Quincy Tse; Enabling Resource Awareness for In-Network Data Processing in Wireless Sensor Networks; ADC '08: Proceedings of the Nineteenth Conference on Australasian Database, pp. 107-114; Australian Computer Society, Inc., Darlinghurst, Australia, 2007 (http://crpit.com/confpapers/CRPITV75Roehm.pdf).

Qingchun Ren and Qilian Liang; Energy and Quality Aware Query Processing in Wireless Sensor Database Systems; Information Sciences: an International Journal—vol. 177, pp. 2188-2205; Elsevier Science Inc., New York, NY, USA 2007 (http://portal.acm.org/citation.cfm?id=1230334).

Monica Scannapieco, Antonino Virgillito, Carlo Marchetti, Massimo Mecella and Roberto Baldoni; The DaQuinCIS architecture: a platform for exchanging and improving data quality in cooperative information systems; Information Systems—vol. 29(7), pp. 551-582, Elsevier Science Ltd., Oxford, UK, 2004 (http://portal.acm.org/citation.cfm?id=1024528).

N. Tatbul; Load Shedding Techniques for Data Stream Management Systems; PhD Thesis, Brown University, Providence, RI, Dec. 2006 (http://www.cs.brown.edu/research/pubs/theses/phd/2007/tatbul.pdf).

Nesime Tatbul, Ugur çetintemel, Stanley B. Zdonik, Mitch Cherniack and Michael Stonebraker; Load Shedding in a Data Stream Manager; VLDB, pp. 309-320; Department of Computer Science, Brown University, Providence, RI; 2002 (http://citeseer.ist.psu.edu/cache/papers/cs/32681/ftp:zSzzSzftp.cs.brown.eduzSzpubzSztechreportszSz02zSzcs02-12.pdf/tatbul02load.pdf).

Nesime Tatbul and Stan Zdonik; Window-Aware Load Shedding for Aggregation Queries over Data Streams; Proceedings of the 32nd International Conference on Very Large Data Bases, pp. 799-810; VLDB Endowment, 2006 (http://www.inf.ethz.ch/personal/tatbul/publications/vldb06.pdf).

Felix Naumann, Johann-Christoph Freytag, Ulf Leser; Completeness of integrated Information sources; Workshop on Data Quality in Cooperative Information Systems 2003 (DQCIS), Siena, Italy 2003 (http://www.hiqiq.de/publications/DQCIS03a.pdf).

Armin Roth and Felix Naumann; System P: Completeness-driven Query Answering in Peer Data Management Systems; Proceedings of the 12th GI Symposium on Database Systems in Business, Technology and Web, Aachen, Germany, 2007 (http://www.btw2007.de/paper/p625.pdf).

Ulf Leser, Felix Naumann; Query Planning with Information Quality Bounds. Proceedings of the 4th International Conference on Flexible Query Answering (FQAS), Warsaw, Poland, Oct. 2000 (http://www.hiqiq.de/publications/FQAS00.pdf).

* cited by examiner

QUALITY-DRIVEN OPTIMIZATION OF SENSOR STREAM PROCESSING

FIELD OF THE INVENTION

The invention relates generally to data stream processing, and, more specifically, to quality-driven optimization of sensor stream processing.

BACKGROUND OF THE INVENTION

Smart monitoring systems use sensor data to guide automatic manufacturing processes and complex business decisions. The restricted quality of sensor data due to limited sensor precision and sensor failures poses a crucial problem, which is very often ignored by the application owners. If not handled carefully, these data quality deficiencies result in misguided or even incorrect decisions.

Data stream management systems have been developed to process continuous data flows of high data rate and volume. For example, data streams are recorded in sensors networks to control manufacturing processes or maintenance activities. Further, turnover values or sales volume may be streamed from distributed affiliations to the central controlling department to derive management strategies. Data stream systems encounter limitations such as, limited memory capacity, data transfer capability and computational power. One way to address these constraints is to reduce the data stream volume, which can result in loss of information. For instance, data processing results such as aggregations may have to be approximated resulting in incorrect or incomplete outcomes. Moreover, this may exacerbate the already existing problem of limited data quality in multiple dimensions of data stream sources. Inaccuracies may result, for example, by sensor imprecision, by typos in text elements, or by RFID readers failing to scan an item properly. The completeness of a data stream is reduced whenever a true world event is missed due to sensor or system malfunction.

SUMMARY OF THE INVENTION

A system and method to perform data quality driven optimization of a data processing path are described. The method includes iteratively testing configurations of a data processing path until a configuration that processes data to predefined quality requirements is identified.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
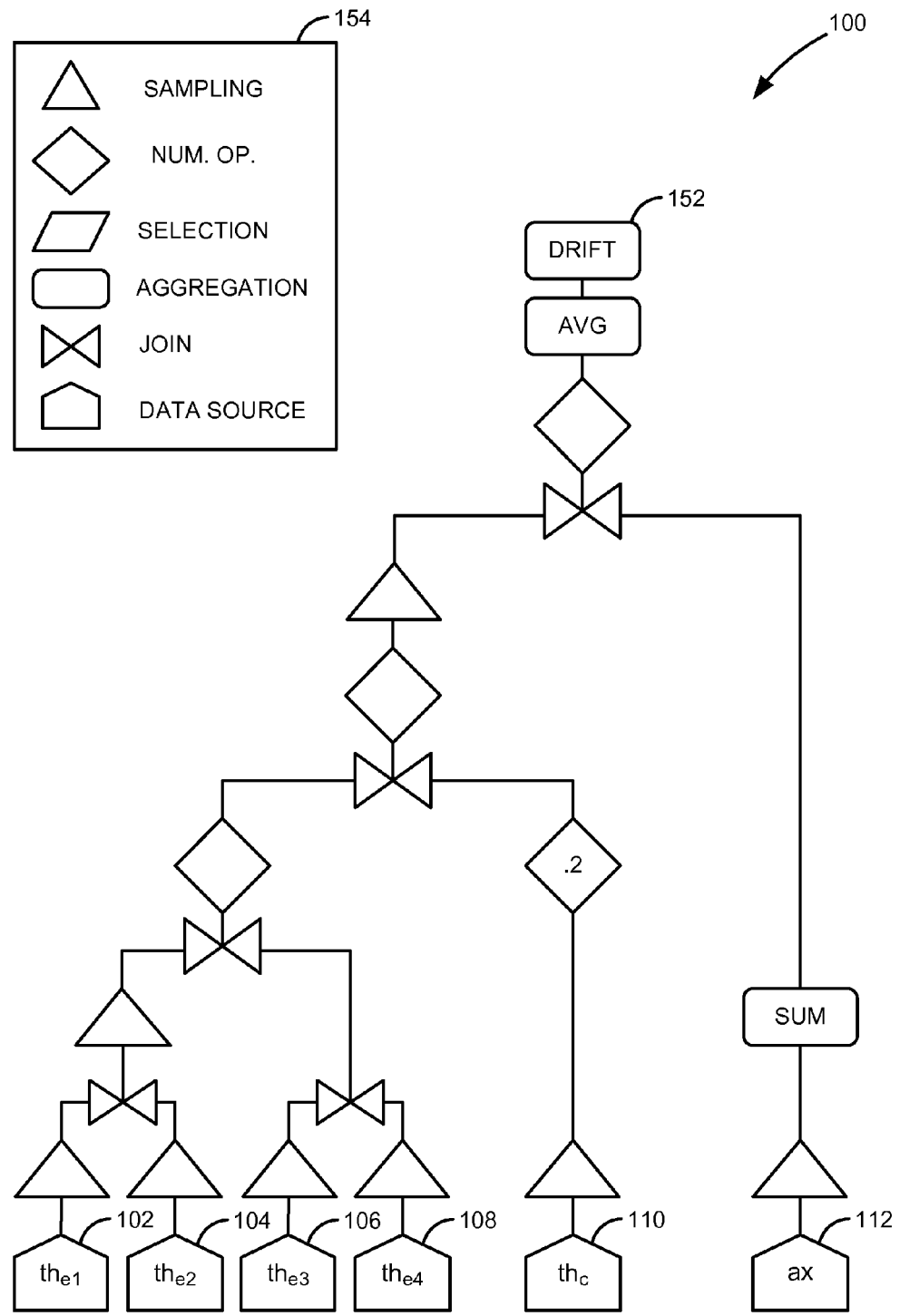
FIG. 1 is an exemplary block diagram comprising a processing tree of a data processing sequence.

Embodiments of systems and methods for optimizing data quality processing are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "this embodiment" means that a particular feature, structure, or characteristic described in connection with the embodiment is included in at least one embodiment of the present invention. Thus, the appearances of the phrases "in one embodiment" or "in this embodiment" in various places throughout this specification are not necessarily all referring to the same embodiment. Furthermore, the particular features, structures, or characteristics may be combined in any suitable manner in one or more embodiments.

Embodiments of the invention may be used in systems where data is collected and processed to allow for automatic process control and to guide business decisions, for example, in manufacturing, or in analysis of qualitative data. Based on the outcome of the processing of the data, decisions may be made for the process providing the data. For the processing to produce reliable output, the collected data may need to satisfy quality requirements. Data quality represents how good data is for a specific application. A data quality dimension may be defined as an aspect describing the utility of data. Different data quality dimensions may be applicable in different applications or different scenarios. Examples of data quality dimensions are timeliness, completeness, confidence, accessibility, readability, and so on. For example, the processing of data may estimate that the dimension timeliness is not of the expected quality, that is, the dimension timeliness does not fulfill the requirements set forth for that particular dimension for that particular scenario. Thus, a system may include instructions to be applied on the process generating the data in case timeliness is estimated to be of undesirable quality. An operator is typically an operation used in the processing of data. In other words, data processing is the process of applying a set of operators to data in a certain sequence (thus producing output to guide business decisions). Some examples of operators are selection, projection, join, interpolation, aggregation, and so on. Some operators may have attributes and some may not. Attributes may also be referred to as "parameters". Some operators may influence the quality of data and some may not influence the quality of data. For example, projection does not influence the quality of data, while aggregation influences the quality of data. Table 1 below lists exemplary data quality operators with their parameters:

TABLE 1

| Operator | Parameter | Accuracy | Confidence | Completeness | Amount of Data | Timeliness | Stream Volume | Granularity |
|---|---|---|---|---|---|---|---|---|
| Projection | — | | | | | | | |
| Selection | — | | | | | | | |

TABLE 1-continued

| Operator | Parameter | Accuracy | Confidence | Completeness | Amount of Data | Timeliness | Stream Volume | Granularity |
|---|---|---|---|---|---|---|---|---|
| Join | — | | | | | | | |
| Aggregation | Group size | | | | + | | − | − |
| Sampling | Rate | | − | − | | + | + | |
| Frequency Analysis | Group size | | | | + | | − | − |
| Filter | Group size | | | | | | | |
| Algebra | — | | | | | | | |
| Threshold | — | | | | | | | |

Embodiments described herein provide an algorithm and architecture to define an optimal setting for at least some of the parameters for the processing of data according to a scenario. Parameters, in the processing, may have desirable optimum values for the processing of data in a given scenario (for example, based on user requirements). Moreover, some parameters may influence other parameters, that is, the change of the setting of one parameter may influence another parameter. That is why, it may be necessary to find compromises between parameter settings. The finding of these compromises is known as multi-objective optimization. Thus, an embodiment of the invention may define all optimum compromises of parameter settings for the processing of data in a scenario so that there is a combination of the best possible compromises for the quality of data processing in a given scenario. The combination of the best possible compromises of parameter settings is relevant within a specific scenario, that is, each scenario may require different quality of data processing based on user requirements or on the nature of data itself, thus, best possible compromises for one scenario may not be relevant for another scenario.

FIG. 1 is an exemplary processing tree of a data processing sequence. The data processing sequence is also referred to as "path" or "processing path". Referring to FIG. 1, the data processing tree 100 uses the following operators, as defined in block 154: sampling, numerical operators, selection, aggregation, and join. Within the data processing tree 100, data is collected from data sources 102 through to 112. Applying the sequence of operators (also referred to as processing path) in the data processing tree 100 yields the result of the processing in block 152. Depending on the scenario, it may be necessary to improve the quality of the data processing in the tree 100. Thus, it may be necessary to test and identify a configuration of the parameters of the operators in the tree 100 to achieve an optimal configuration of the best possible compromise of parameter settings as required by the specific scenario in which the processing tree 100 is used. Finally, if a compromise is reached, the data processing tree 100 may derive outcome that better reflects predefined quality requirements.

Figure 2:
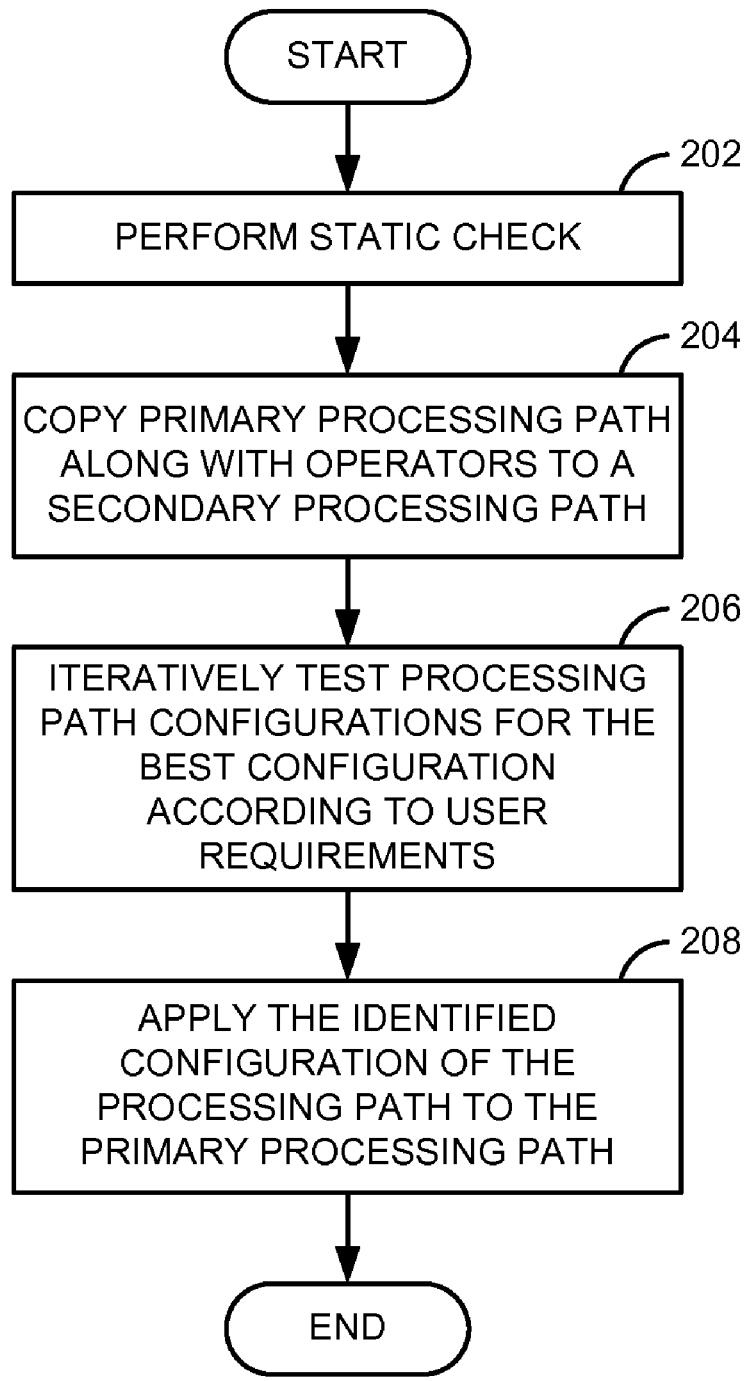
FIG. 2 is a flow diagram of an embodiment of the invention for data quality driven optimization of data processing.

FIG. 2 is a flow diagram of an exemplary embodiment of the invention for data quality driven optimization of data processing. Referring to FIG. 2, at process block 202, a static check is performed. The static check estimates if user defined requirements in the quality of processing can be achieved. For example, there may be external constraints that make it impossible for the data processing to be optimized as per the quality requirements of the user. Such constraints may be the precision of the data sources that obtain the data or the rate of data provision. Identified conflicts are reported to the user. At process block 204, the primary data processing path is copied along with its operators to a secondary processing path. The secondary processing path allows the optimization to be performed simultaneously with the primary processing, thus saving time and resources. At process block 206, processing path configurations are iteratively tested in order to estimate best possible configuration for the processing path so that the user quality requirements are met. At each iteration, the secondary processing path is run with a specific configuration of a partition of data, a set of sampling operators, a set of interpolation operators, and a set of data group sizes. Running the processing path with the specific configuration produces average values for the data quality parameters required by quality requirements. If these parameter values do not meet the quality requirements, iterations may follow until a configuration of the secondary processing path derives average data quality parameter values meeting the quality requirements.

However if the parameters do meet the quality requirements, at process block 208, the identified configuration is applied to the primary processing path. The identified configuration is such that, when applied, the resulting processed data will meet the data quality requirements of data quality dimensions as required by the user. Applying this configuration to the primary processing path optimizes the primary processing path so that the data processed by the primary processing path is of quality that is better suited to the scenario and the user requirements. For example, if a configuration that is of a certain quality of readability and timeliness of data is desired then a configuration of the processing path that yields such a result may be identified.

Figure 3:
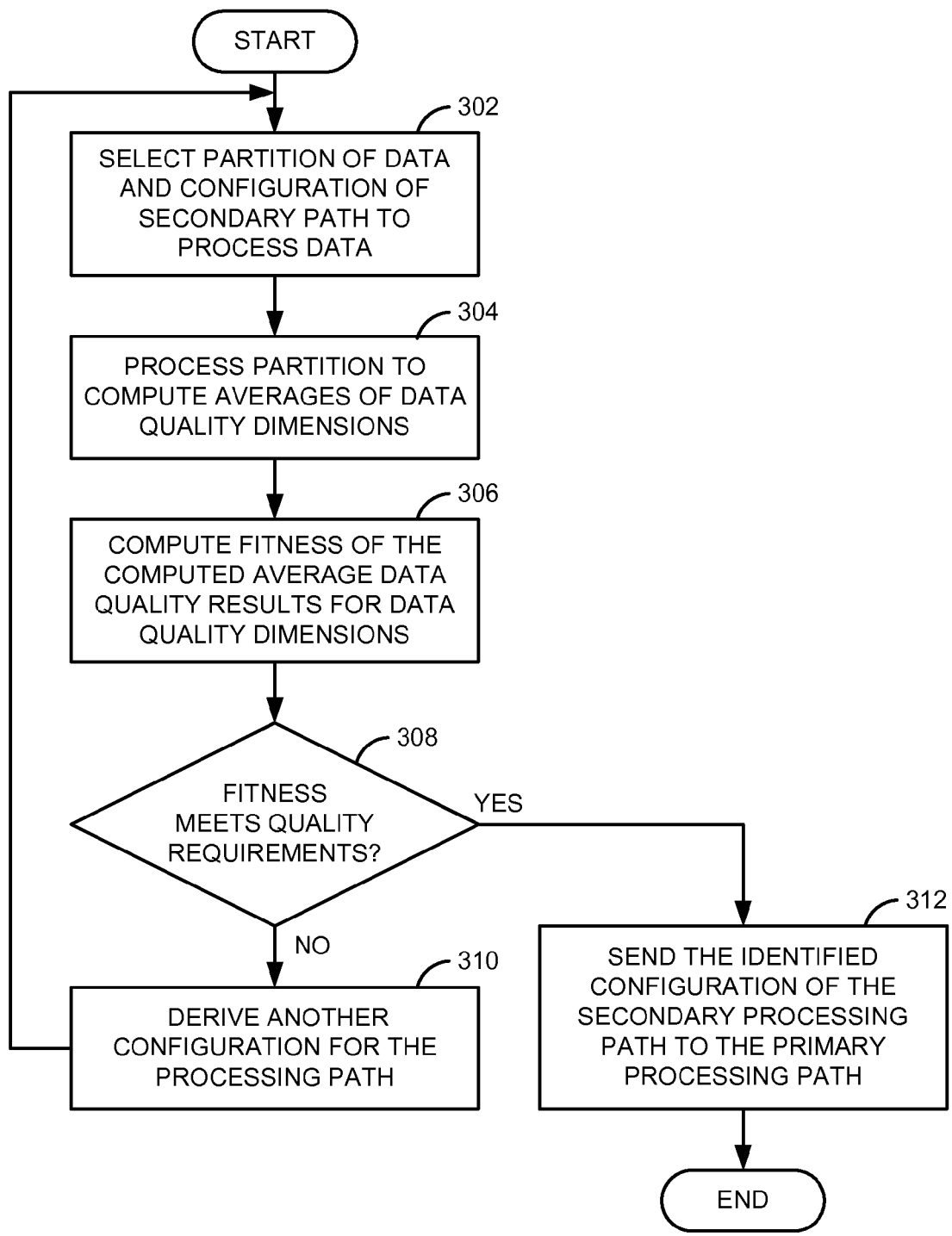
FIG. 3 is a flow diagram of an embodiment of the invention for a data quality driven optimization.

FIG. 3 is a flow diagram of an embodiment of the invention for a data quality driven optimization. Referring to FIG. 3, at process block 302, a combination of configuration parameters for the secondary processing path is selected. The secondary processing path processes the same data as the primary processing path at the same time. These may include a partition of the data to process, a set of sampling operators, group sizes, and interpolation rates. The partition of the data is used because the data collected from the data sources may be of a huge quantity and thus difficult and costly to process at one time. At processing block 304, the selected partition is processed at the secondary processing path. Processing the partition yields average values for monitored data quality dimensions. The monitored data quality dimensions are set forth in predefined quality requirements. At process block 306, the averages are used to compute the fitness of the averages. The fitness of the averages represents how well, if at all, the averages meet the quality requirements. At process block 308, a check is performed to estimate if the computed fitness meets quality requirements. If the computed fitness does not meet the quality requirements, at process block 310, another configuration for the secondary processing path is derived using the data quality dimension averages, thus starting another iteration. As subsequent configurations of the secondary processing path is derived from averages of data quality dimensions from the previous configuration of the secondary processing path, with each iteration, the secondary processing path is fine tuned closer and closer to the quality requirements. Fine tuning the configuration means that the next configuration is derived from the computed fitness, but also with the quality requirements used as a guide. In other words, the next configuration may attempt to bridge the gap between the fitness and the quality requirements. The iterations and testing of configurations of the processing path may be performed until at some iteration at process block 308, the check estimates that the fitness of the computed averages of data quality dimensions meets the quality requirements. At process block 312, the identified configuration is sent to the primary processing path. As the primary processing path is run with the identified optimized configuration, the processed data, which is the result of the primary processing path, will have data quality dimensions as required in the quality requirements.

Figure 4:
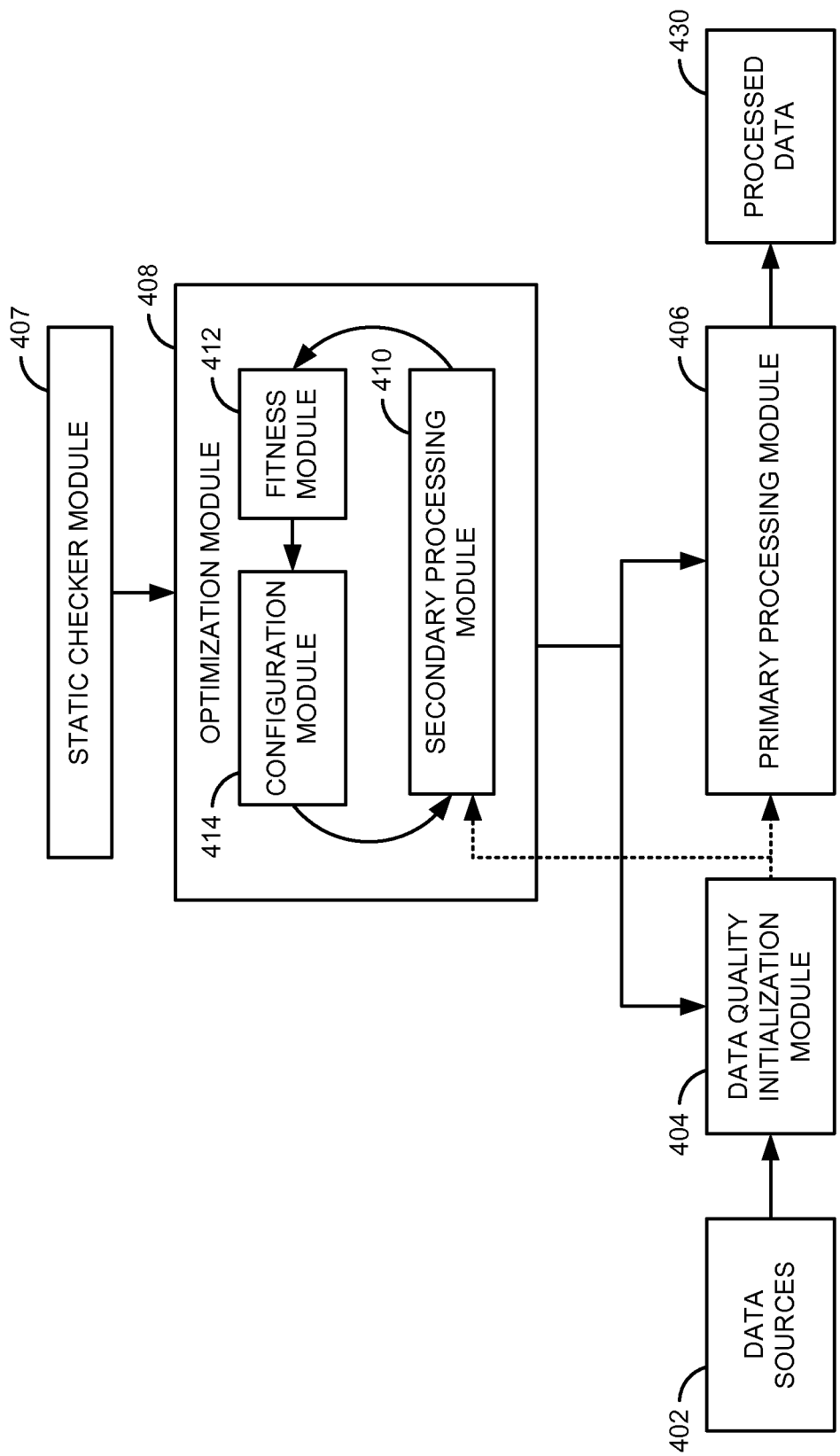
FIG. 4 is a block diagram of an embodiment of the invention for a system performing data quality driven optimization.

FIG. 4 is a block diagram of an embodiment of the invention for a system for data quality driven optimization of data processing. Referring to FIG. 4, the data sources 402 collect data for processing. The data sources 402 may be a variety of sources, such as sensors to collect data streams, data bases, data warehouses, and any source capable of collecting data. The data quality initialization module 404 determines the data quality of the data that is collected by the data sources 402. For example, the completeness is initialized by controlling the amount of collected data against the expected amount of data. The primary processing module 406 includes a data processing path along with operators to process the data collected at the data sources 402. The optimization module 408 may contain: the secondary processing module 410, the fitness module 412, and the configuration module 414. The secondary processing module 410 receives a copy of the data processing path of the primary processing module 406. Further, the secondary processing module 410 receives a partition of the data processed in the primary processing module 406. Only the partition of the data is used because the data collected from the data sources 402 may be of a huge quantity and thus the optimization process would be very costly. The optimization module 408 iteratively tests configurations of the processing path in the secondary processing module 410. A configuration of the processing path is a combination of a set of sampling sizes, a set of interpolation rates, and a set of group sizes. Each configuration causes the secondary processing module 410 to produce processed data that has a specific set of averages of data quality dimensions. The fitness module 412 computes a fitness from the averages of the data quality dimensions. If the computed fitness meets data quality requirements, the configuration of the processing path can be sent to the primary processing module 406. If the fitness does not meet the data quality requirements, the configuration module derives another configuration for the secondary processing module 410 to use and test. The optimization module 408 may iterate computing fitness values and deriving configurations until a configuration that produces data with a fitness meeting the data quality requirements is found.

In one embodiment, the optimization module 408 may use an optimization algorithm that applies a heuristic optimization technique called Evolution Strategy (ES) that is based on ideas of biological adaptation and evolution and supports multi-objective as well as single-objective optimization problems. There are various strategies to solve multi-objective optimization problems. Pareto optimization allows the finding of a set of optimal compromises. The Pareto set is defined as the set of optimization solutions that dominates all other possible solutions. That is, the improvement of one sub-objective is only possible with a decline of one or more of the other sub-objectives. Moreover, the different objectives can be summarized in one function, which will be minimized or maximized. Priorities can be defined for each objective determining the order of optimization. This may be done prior to the algorithm execution, for example by weighing the sub-objectives or by a lexicographical ordering. Another possibility is the selection or prioritization of the sub-objectives after the execution of the optimization algorithm. The main advantage of the multi-objective optimization is the automatic optimization of different aims by determining optimal compromises. No user-defined weighing or ordering is necessary, which restrict the search space and may lead to minor optimization solutions. Instead, the user is supported by a set of Pareto optimal compromises and can decide after the algorithm execution which solution fits best to the set of requirements of the current optimization.

In one embodiment, the method as described in FIG. 2 is performed by components as described in FIG. 4. Referring to FIGS. 2 and 4, at process block 202, the static checker module 407 performs a static check. The static check estimates if user defined requirements in the quality of processing can be achieved. For example, there may be external constraints that make it impossible for the data processing to be optimized as per the quality requirements of the user. Such constraints may be the precision of the data sources 402 that obtain the data or the rate of data provision. If conflicts are found, they are reported to the user. At process block 204, the optimization module 408 receives a copy of the primary data processing path of the primary processing module 406 to copy to a secondary processing path in the secondary processing module 410. The secondary processing path allows the optimization to be performed simultaneously with the primary processing, thus saving time and resources. At process block 206, the optimization module 408 iteratively tests processing path configurations to estimate the best possible configuration for the processing path so that the quality requirements are met. At each iteration, the secondary processing path is run with a specific configuration of a partition of data, a set of sampling operators, a set of interpolation operators, and a set of data group sizes. Running the processing path with the specific configuration produces average values for the data quality parameters required by the user quality requirements. If these parameter values do not meet the user's quality requirements, iterations may follow until a configuration of the secondary processing path derives average data quality parameter values meeting the quality requirements. At process block 208, the optimization module 408 applies the identified configuration to the primary processing path. The identified configuration is such that, when applied, the resulting processed data will meet the data quality requirements of data quality dimensions as required by the user. Applying this configuration to the primary processing path optimizes the primary processing path so that the data processed by the primary processing path is of quality better suited to the scenario and user requirements. For example, a configuration may be desired so that the readability and timeliness of data is of a certain quality. Thus, a configuration of the processing path may be identified so that when applied, the processed data has the desired average readability and timeliness as required.

In one embodiment, the method as described in FIG. 3 is performed by components as described in FIG. 4. Referring to FIGS. 3 and 4, at process block 302, the optimization module 408 selects a combination of configuration parameters for the secondary processing path in the secondary processing module 410. These may include a partition of data to process, a set of sampling operators, group sizes, and interpolation rates. At processing block 304, secondary processing module 410 processes the selected partition. Processing the partition yields average values for monitored data quality dimensions. The monitored data quality dimensions are set forth in the user defined quality requirements or are imposed into $\kappa_i$ consecutive, non-overlapping jumping data quality windows w(k) $1 \leq k \leq \kappa_i$, each of which is identified by its starting point $tw_b$, its end point $tw_e$, the window size $\omega_i$ and the corresponding attribute $A_i$ as illustrated in the exemplary Table 2 below.

TABLE 2

| Timestamp | ... | 210 | 211 | 212 | 213 | 214 | 215 | 216 | 217 | 218 | 219 | ... |
|---|---|---|---|---|---|---|---|---|---|---|---|---|
| Pressure | ... | 180 | 178 | 177 | 175 | 176 | 181 | 189 | 201 | 204 | 190 | ... |
| Accuracy | ... | | | 3.0 | | | | | 3.9 | | | ... |
| Confidence | ... | | | 4.4 | | | | | 21.7 | | | ... |
| Completeness | ... | | | 0.9 | | | | | 0.8 | | | ... |
| DataBasics | ... | | | 1 | | | | | 1 | | | ... |
| | | | | $t_b = 210$ | | | | | $t_b = 215$ | | | |
| | | | | $t_e = 214$ | | | | | $t_e = 219$ | | | |
| | | | | $\omega = 5$ | | | | | $\omega = 5$ | | | | by the nature of the scenario, such as the type of manufacture or industry. At process block 306, the averages are used by the fitness module 412 to compute the fitness of the averages. The fitness of the averages represents how well, if at all, the averages meet the quality requirements. At process block 308, the optimization module 408 checks if the computed fitness meets quality requirements. If the computed fitness does not meet the quality requirements, at process block 310, the configuration module 414 derives another configuration for the secondary processing path using the data quality dimension averages. As each following configuration of the secondary processing path is derived from averages of data quality dimensions from the previous configuration of the secondary processing path, with each iteration, the secondary processing path is fine-tuned closer and closer to the quality requirements. The iterations and testing of configurations of the processing path may be performed until at some iteration, at process block 308, the optimization module 408 estimates that the fitness of the computed averages of data quality dimensions meets the quality requirements. At process block 312, the identified configuration is sent to the primary processing path in the data quality initialization module 404 and the primary processing module 406. As the primary processing module 406 runs the primary processing path with the identified optimized configuration, the processed data that is the result of the primary processing path will have data quality dimensions as required in the quality requirements.

Embodiments of the present invention may be implemented for various purposes in various industries where data quality monitoring and optimization is of importance. For example embodiments of the present invention may include data streams to control manufacturing processes, to guide automatic production lines, for decision support at high-level management (customer, financial, and economic data streams), to monitor telecommunication networks, and to monitor patients in a hospital (for instance heart rate).

In one embodiment, a system of the embodiment of the invention performs data quality driven optimization of a data stream. As used hereinafter, a "data stream" may comprise a continuous stream of m tuples $\tau$, consisting of n attribute values $A_i$ ($1 \leq i \leq n$) and the represented time interval $[t_b, t_e]$. To allow for the efficient management of data quality in data streams, a data quality window approach is adopted. In one embodiment, a data quality window may be used as a partition in the secondary processing path in the process described in FIG. 3. Data quality information is not forwarded for each single data item, but aggregated over $\omega_i$ data items independent for each stream attribute $A_i$. The stream is partitioned into $\kappa_i$ consecutive, non-overlapping jumping data quality windows w(k) $1 \leq k \leq \kappa_i$, each of which is identified by its starting point $tw_b$, its end point $tw_e$, the window size $\omega_i$ and the corresponding attribute $A_i$ as illustrated in the exemplary Table 2 below.

Beyond the data stream items $x(j)(tw_b \leq j \leq tw_e)$, the window may contain |Q| data quality information $q_w$, each obtained by averaging the tuple-wise data quality information over the window.

The data quality Q of a data stream D may be defined by a set of five data quality dimensions: accuracy a, confidence $\epsilon$, completeness c, data amount d and timeliness u. In one embodiment, these data quality dimensions and their average values are computed by a secondary processing module such as the one described in FIG. 4 in a secondary processing path such as the secondary processing path described in FIG. 3.

The data quality-driven optimization configures the data stream processing to maximize the above defined stream data quality while guaranteeing the compliance to the restricted system resources. In one embodiment, an optimization module, such as the one described in FIG. 4, performs this configuring of the data stream processing. The data stream volume V is used as a metric for the resource load. From a user's point of view, a high data volume has positive effects, because a high data volume provides more details, and with more details in the data stream, a better decision may be made. To measure data granularity, a timeframe T represented by one data stream tuple is selected. While raw data depicts one point in time, the result of a data stream aggregation represents a larger time interval. The wider the timeframe, the lower is the granularity. To support the detailed evaluation of streaming data, the granularity has to be maximized.

With respect to the five data quality dimensions given above, accuracy describes defects or imprecision of data stream sources; thus, the accuracy may not be improved by any operator configuration. The objectives determined above span different value domains. For example, the window completeness constitutes values in the range $0 \leq c_w \leq 1$, while the absolute systematic error in the dimension accuracy is unlimited: $0 \leq a_w \leq \infty$. To allow for the quantitative comparison of different objectives, the objective functions are normalized to the range [0,1].

The confidence illustrates the statistical error $\epsilon$ due to random environmental interferences (e.g. vibrations and shocks) defining the interval $[v-\epsilon; v+\epsilon]$ around the data stream value v containing the true value with the confidence probability p. In one embodiment, confidence $\epsilon$ may be defined by (1−p/2)-quantil $\alpha$ and the data variance $\sigma^2$ of each data quality window w. For example, for p=99%, the initial confidence of a data quality window including the pressure measurement values {181, 189, 201, 204, 190} is set to $\epsilon_w = \alpha \cdot \sigma = 2.58 \sim 8.4$ bar.

The average statistical error over all data stream attributes has to be minimized to maximize the data quality confidence. The objective function is normalized by division with the maximal statistical confidence error $\epsilon_{max}$ in the stream. The objective $f_\epsilon$ is defined as follows:

$$f_\epsilon: \min \frac{1}{n \cdot \varepsilon_{max}} \sum_{i=1}^{n} \frac{1}{k_i} \sum_{k=1}^{k_i} \varepsilon_w(k)$$

The completeness addresses the problem of missing values due to stream source failures or malfunctions. As a compromise between the quality of value estimation and computational capacity, linear interpolation is applied.

The data quality dimension completeness c may be defined as the ratio of originally measured, not interpolated values compared to the size of the analyzed data quality window. For example, if a temperature sensor in a monitoring system fails briefly two times during a data quality window (r=1/min, ω=1 h). The completeness for this window is set to $c_w$=0.967. To conform with the objective above, the objective of maximal completeness is transformed to the minimizing problem $f_c$, which minimizes the ratio of interpolated data items. It is normalized using the maximal incompleteness $1-c_{min}$ as follows:

$$f_c: \min \frac{1}{n \cdot (1 - c_{min})} \sum_{i=1}^{n} \frac{1}{k_i} \sum_{k=1}^{k_i} (1 - c_w(k))$$

The data amount determines the set of raw data x used to derive a data stream tuple y=f(x). The higher the amount of data, the more reliable is the processed information. To transform the objective to a minimization problem, the difference to the highest possible data amount d=m that comprises the complete data stream whose maximum at the same time serves as normalization weight, is calculated as follows:

$$f_d: \min \frac{1}{n \cdot (m - d_{min})} \sum_{i=1}^{n} \frac{1}{k_i} \sum_{k=1}^{k_i} (m - d_w(k))$$

To maximize the data quality dimension timeliness, the average tuple age has to be minimized. Therefore, the age is computed as difference between tuple timestamp t(j) and correct system time clock, normalized by the maximum age $u_{max}$ as follows:

$$f_u: \min \frac{1}{m \cdot u_{max}} \sum_{j=1}^{m} u(j) = \frac{1}{\text{clock } t_{min}} \cdot \left[ \text{clock} - \frac{1}{m} \sum_{j=1}^{m} t(j) \right]$$

The data stream volume V defines the number of transferred data values in n stream attributes and m data tuples: V=m·n. The transferred data quality information is incorporated in the calculation. The additional volume is computed based on the number of transferred data quality dimensions $Q_i$ per attribute $A_i$ and the average data quality window size $\overline{\omega}_i$.

$$V = m \cdot (n + 1) + \sum_{i=1}^{n} \frac{m}{\overline{\omega}_i} \cdot |Q_i|$$

To normalize the stream volume to the data range [0, 1], the maximal possible stream length $m_{max} = r_{max}/r \cdot m$ determined by a current stream rate r and the maximal manageable rate $r_{max}$ (e.g., $r_{max}$=1+ms) is considered. The maximum data volume depends further on the maximum data quality window size ω=1, such that $$V_{max} = m_{max} \cdot (n + 1) + m_{max} \cdot \sum_{i=1}^{n} |Q_i|.$$

whereas the first term on the right hand side depicts the maximum data volume of the traditional data stream components and the left term describes the maximum data quality volume. To minimize the costs for data stream transfer and processing, the normalized data stream volume has to be minimized.

$$f_V: \min \frac{V}{V_{max}}$$

The data stream granularity T may be measured as the average time frame $[t_e - t_b]$ represented by the m data stream tuples. For raw data items describing one point in time, the granularity equals 0, as $t_e = t_b$. To maximize the granularity, the average timeframe normalized by its maximum $T_{max}$ has to be minimized.

$$f_T: \min \frac{1}{m \cdot T_{max}} \sum_{j=1}^{m} t_e(j) - t_b(j)$$

To optimize the data quality in a data stream, in one embodiment, a set of configuration parameters are configured, which may include, but are not limited to, aggregation, sampling, interpolation, frequency analysis, and filtering. In one embodiment, these configuration parameters may be configured by a configuration module as described in FIG. 4. In one embodiment, these configuration parameters may be iteratively combined and tested to derive a configuration that when applied on a data stream processing may process a data stream and produce data quality dimension values in line with a set of quality requirements.

In one embodiment, a system is implemented to monitor the pressure of hydraulic systems to detect leaks or blocks. A set of sensors (e.g. oil viscosity, particle contamination, pressure, and temperature) is used to control the ageing of hydraulic oil, for example, to predict efficient maintenance dates for oil change. In this context, the sensor data quality has to be monitored, for example, to prevent from undetected contaminated oil corroding system components like filters or sealing. If sensor data quality is not properly monitored, this may lead to high maintenance costs or even a system breakdown. In one embodiment, sensor data quality may be monitored using the process described in FIG. 3.

In another embodiment, a system is implemented to monitor changes in climate for a given region. Using a real-world weather dataset that consists of cloud and weather measurements over several years recorded at land stations and ships all over the globe. Each tuple is identified by time (year, month, day, and hour) and place (latitude, longitude) of recording and contains information about present weather, cloud cover, solar attitude, etc. In an exemplary processing path, the embodiment of the invention evaluates weather measurements taken at land stations in the month of June 1990. For example, the query

```
SELECT AVG(total_cloud_cover)
FROM june90
WHERE latitude > 37470 AND latitude < 37480
AND longitude > 12220 AND longitude < 12230
GROUP BY day
``` determines the average daily cloud cover in June 1990 for the city of San Francisco. The achieved data quality of query results is analyzed. Another exemplary processing path combines the measurements of June 1990 and June 1991. With the help of the join attributes, longitude and latitude, the weather measurements taken at all land stations for June of the two consecutive years are combined. For example, this join strategy could be used to identify weather or temperature shifting over several years.

Some example embodiments of the invention may include the above-illustrated modules and methods being written as one or more software components. These components, and the functionality associated with each, may be used by client, server, or peer computer systems. These components may be written in any computer programming languages including object-oriented computer languages such as C++, and Java. The functionality described herein may be distributed among different components and may be linked to each other via application programming interfaces and compiled into one complete server and/or client application. Furthermore, these components may be linked together via distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or other configurations.

Software components described above are tangibly stored on a machine readable medium including a computer readable medium. The term "computer readable medium" should be taken to include a single medium or multiple media that stores one or more sets of instructions. The term "computer readable medium" should also be taken to include medium that is capable of tangibly storing or encoding instructions for execution by a computer system and that causes the computer system to perform any of the methods described herein.

Figure 5:
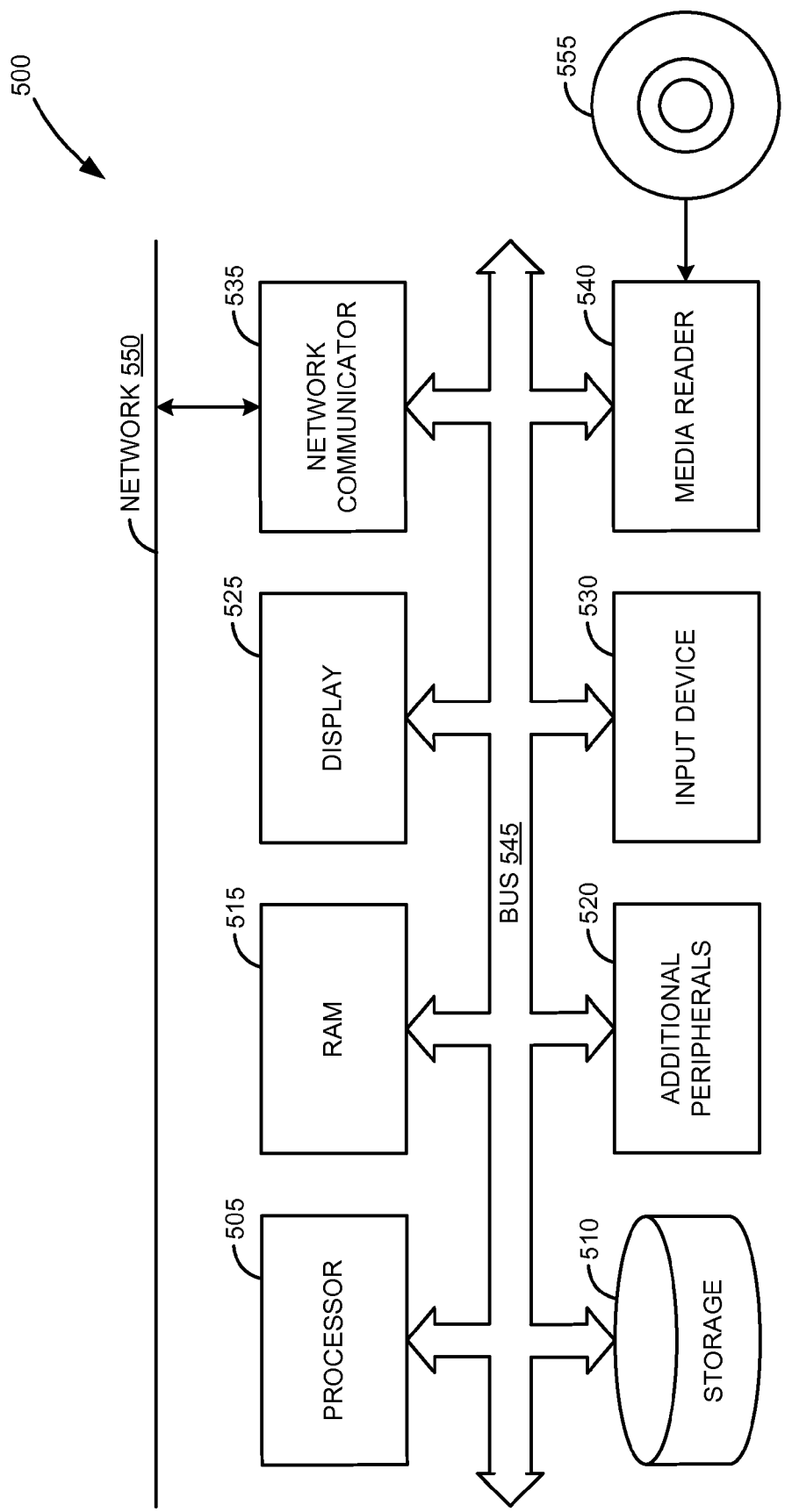
FIG. 5 is a block diagram of another embodiment of the invention for a system for data quality driven optimization.

FIG. 5 is a block diagram of an exemplary computer system 500. The computer system 500 includes a processor 505 that executes programming code tangibly stored on a computer readable medium 555 to perform the above-illustrated methods of the invention. The computer system 500 includes a media reader 540 to read the programming code from the computer readable medium 555 and store the code in storage 510 or in random access memory (RAM) 515. The storage 510 provides a large space for keeping static data where the programming code could be stored for later execution. From the programming code, a series of instructions are generated and dynamically stored in the RAM 515. The processor 505 reads instructions from the RAM 515 and performs actions as instructed. According to one embodiment of the invention, the computer system 500 further includes a display 525 to provide visual information to users, an input device 530 to provide a user with means for entering data and interacting with computer system 500, one or more additional peripherals 520 to further expand the capabilities of the computer system 500, and a network communicator 535 to connect the computer system 500 to a network 550. The components of the computer system 500 are interconnected via a bus 545.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A machine-readable storage device having machine readable instructions for optimizing data quality dimensions tangibly stored thereon which when executed by the machine, cause the machine to perform operations comprising:
    copying a primary data processing path to a secondary data processing path;
    iteratively reconfiguring and testing the secondary processing path to identify at least one configuration meeting a set of quality requirements, wherein configuration of the secondary processing path includes a set of sampling operators, a set of data group sizes, and a set of interpolation rates; and
    iteratively testing configurations comprising:
    processing a partition of data in the secondary processing path to compute averages of data quality dimensions, wherein the data quality dimensions describe utility of data;
    computing a fitness of the data quality dimension averages;
    deriving a further configuration for the secondary processing path when the computed fitness does not meet quality requirements; and
    sending the at least one configuration to the primary processing path when the fitness meets the quality requirements; and
    applying the identified configuration to the primary data processing path.

2. The machine-readable storage device of claim 1, wherein the operations further comprise:
    selecting the partition of data to process; and
    selecting a configuration for the secondary processing path to process the selected partition of data.

3. The machine-readable storage device of claim 1, wherein the primary processing path and the secondary processing path are run simultaneously.

4. The machine-readable storage device of claim 1, wherein a static check is performed to estimate whether external factors allow the quality requirements to be met.

5. The machine-readable storage device of claim 1, wherein data for the primary processing path is collected from a set of data sources.

6. A computer-implemented method, comprising:
    copying a primary data processing path to a secondary data processing path;
    iteratively testing configurations of the secondary processing path with partitions of data to identify a configuration to yield data according to a set of quality requirements, wherein configuration of the secondary processing path includes a set of sampling operators, a set of data group sizes, and a set of interpolation rates; and iteratively testing the configurations comprising:
processing a partition of data in the secondary processing path to compute averages of data quality dimensions, wherein the data quality dimensions describe utility of data;
computing a fitness of the data quality dimension averages;
deriving a further configuration for the secondary processing path when the computed fitness does not meet quality requirements; and
sending the configuration to the primary processing path when the fitness meets the quality requirements; and
applying the identified configuration to the primary data processing path.

7. The method of claim 1, further comprising:
selecting a partition of data to process; and
selecting a configuration for the secondary processing path to process the selected partition of data.

8. The method of claim 6, wherein the primary processing path and the secondary processing path are run simultaneously.

9. The method of claim 6, further comprising performing a static check to estimate whether external factors allow the quality requirements to be met.

10. The method of claim 6, wherein data for the primary processing path is collected from a set of data sources.

11. A computerized system, including a processor, the processor communicating with a memory storing instructions, the instructions comprising:
a primary data processing module to process data collected from a set of data sources;
a data quality initialization module to determine a partition of data for the primary data processing module;
an optimization module to receive a copy of primary data processing path of the primary data processing module and to iteratively reconfigure and test the copy of the primary data processing path to identify a configuration for the primary data processing module meeting a set of quality requirements, wherein configuration of the copy of the primary processing path includes a set of sampling operators, a set of data group sizes, and a set of interpolation rates; and
a static checker module to perform a check to estimate whether external factors allow for the quality requirements to be met.

12. The system of claim 11, wherein the optimization module comprises:
a secondary processing module to receive the copy of the primary data processing path and the partition of data to process data in parallel to the primary processing module, wherein the secondary processing module computes averages of data quality dimensions and the data quality dimensions describe utility of data.

13. The system of claim 12, wherein the optimization module further comprises:
a fitness module to collect the averages of the data quality dimensions from the secondary data processing module and compute a fitness from the collected averages; and
a configuration module to derive a further configuration for the secondary processing module to use when the computed fitness does not meet the quality requirements.

14. The system of claim 13, wherein the further configuration is derived using the averages of the data quality dimensions.

15. The system of claim 11, wherein the data sources include at least one of a sensor, a data base, and a data warehouse.

16. A computerized system, including a processor, the processor communicating with a memory storing instructions, the instructions related to:
copying a primary data processing path to a secondary data processing path;
iteratively reconfiguring and testing the secondary processing path to identify at least one configuration meeting a set of quality requirements, wherein configuration of the secondary processing path includes a set of sampling operators, a set of data group sizes, and a set of interpolation rates and iteratively testing configurations comprises:
processing a partition of data in the secondary processing path to compute averages of data quality dimensions, wherein the data quality dimensions describe utility of data and comprise one or more of accuracy, confidence, completeness, and timeliness of data;
computing a fitness of the data quality dimension averages;
deriving a further configuration for the secondary processing path when the computed fitness does not meet quality requirements; and
sending the at least one configuration to the primary processing path when the fitness meets the quality requirements; and
applying the identified configuration to the primary data processing path.

* * * * *